Aug. 9, 1932.   B. F. FITCH   1,870,991
APPARATUS FOR LIFTING A VEHICLE BODY
Filed May 1, 1930   3 Sheets-Sheet 1
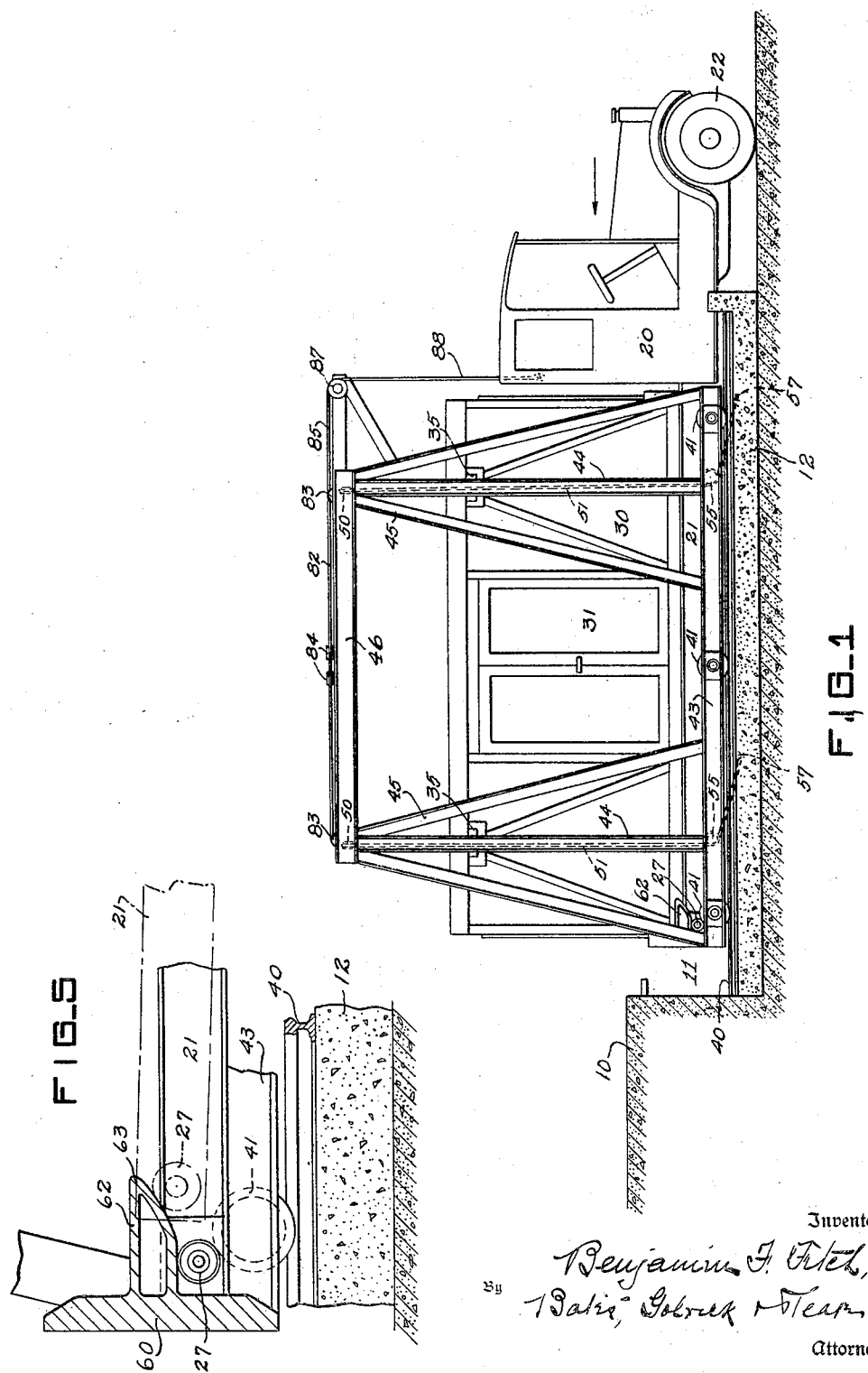

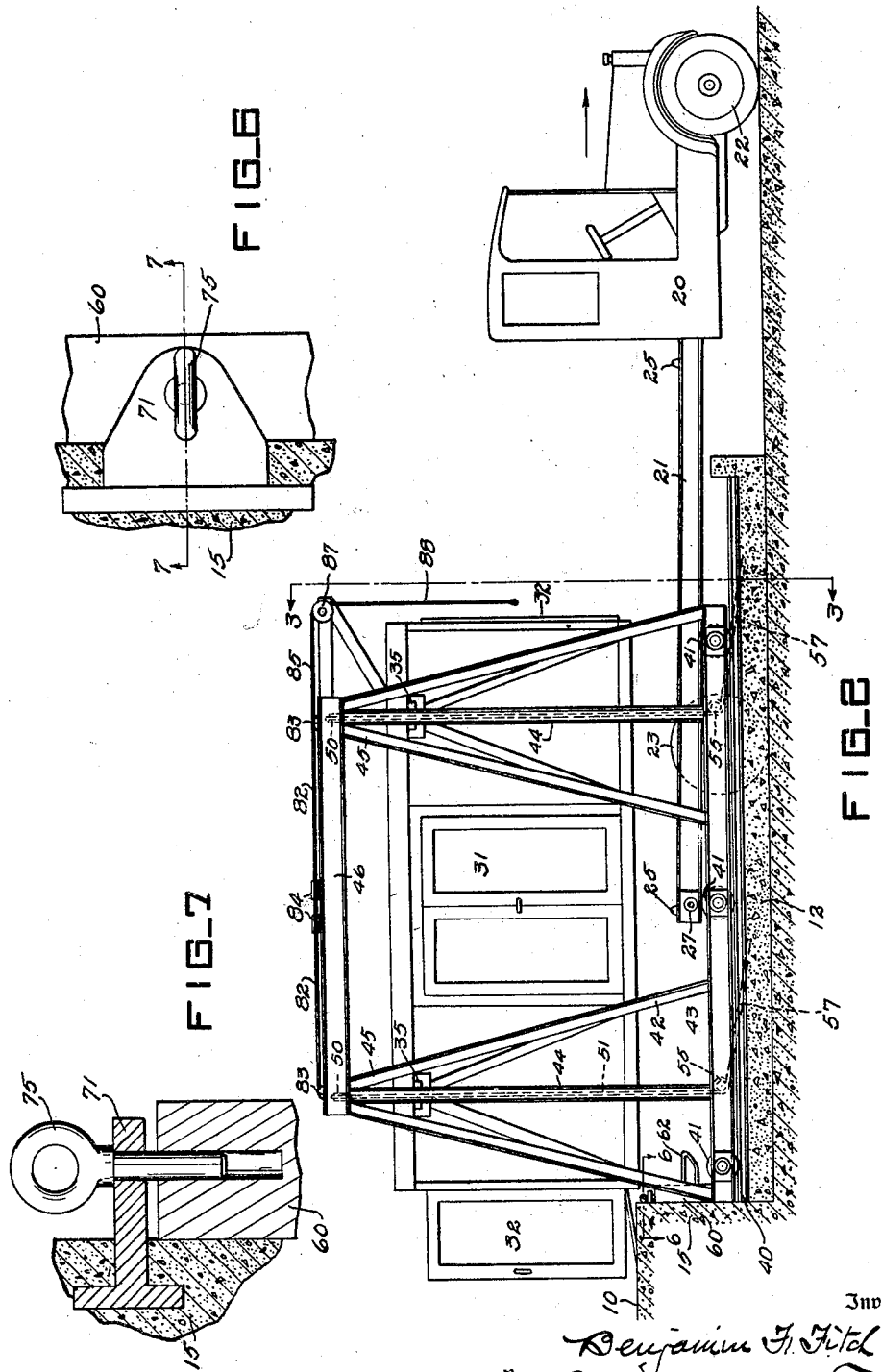

Aug. 9, 1932. B. F. FITCH 1,870,991
APPARATUS FOR LIFTING A VEHICLE BODY
Filed May 1, 1930 3 Sheets-Sheet 3
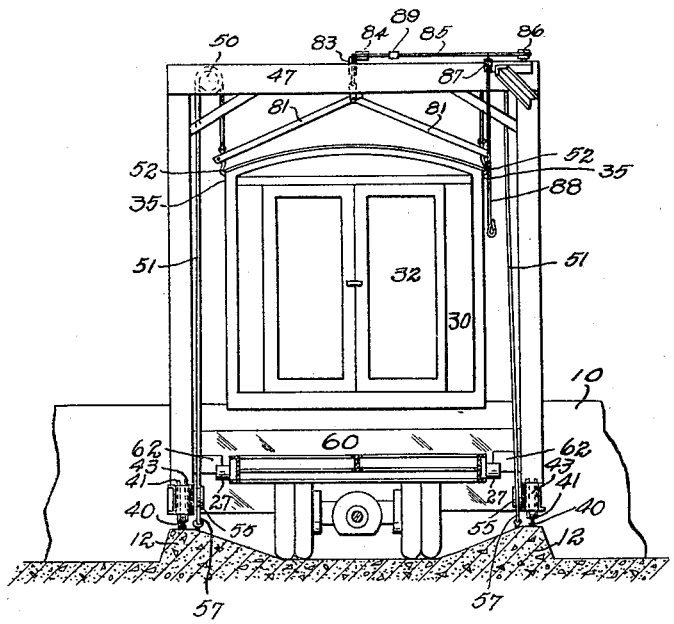
FIG_3
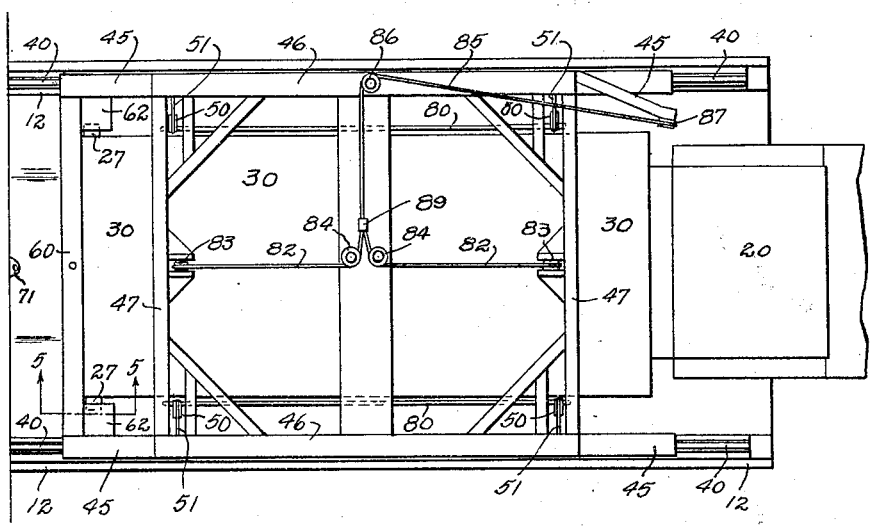
FIG_4
Inventor
Benjamin F. Fitch,
By Baker, Golrick & Tear,
Attorneys Patented Aug. 9, 1932

1,870,991

UNITED STATES PATENT OFFICE

BENJAMIN F. FITCH, GREENWICH, CONNECTICUT, ASSIGNOR TO MOTOR TERMINALS COMPANY, OF WILMINGTON, DELAWARE, A CORPORATION OF DELAWARE

APPARATUS FOR LIFTING A VEHICLE BODY

Application filed May 1, 1930. Serial No. 448,865.

My application No. 369,504 filed June 8th, 1929, sets out a method of handling freight by the employment of automobile trucks and demountable bodies, a loaded body being thus conveyed to a station, then raised and unloaded and after reloading being lowered onto a truck for transference to some other region. The present invention is concerned with apparatus illustrated also in my parent application for carrying out such method. More specifically in the present invention I provide mechanism actuated by the movement of a truck as it backs into position adjacent the platform to raise a demountable body from a truck frame; after which, the truck is free for other duty, while the body is being loaded or unloaded.

My invention is illustrated in the drawings hereof and it is hereinafter more fully described, and its essential novel features are summarized in the claims.

In the drawings, Fig. 1 is a side elevation of the body-raising equipment, showing also a truck and body in the position before the raising of the body begins; Fig. 2 is a similar elevation showing the parts after the body has been raised and the empty truck is driving away; Fig. 3 is an end view of the equipment and truck; Fig. 4 is a plan thereof; Fig. 5 is a vertical section on a larger scale of apparatus for leveling the truck frame as it comes into its final resting position; Figs. 6 and 7 are details of a locking device for anchoring the raising apparatus in position with the container raised, Fig. 6 being a sectional plan and Fig. 7 a vertical section on the line 7—7 of Fig. 6.

As shown in Figs. 1, 2 and 3, a loading platform is indicated at 10, constructed of concrete. In front of this platform is a space on a lower level providing truck runways or "pits" 11, into which the truck may back. Opposite sides of the pit are shown as bounded by raised curbs or walls 12, thus dividing the space into individual truck-backing spaces.

In Figs. 1, 2 and 3, 20 indicates a truck having a low-height rearwardly-extended frame 21, and having the usual supporting wheels 22 and 23, the latter being the driving wheels. This frame 21 is provided on its upper sides with upwardly extending projections 25, which are adapted to coact with correspondingly formed recesses in the base of a demountable body. Such body is shown at 30. It is preferably equipped with the side doors 31 and end doors 32. It has also suitable eyes or overhanging recesses for the engagement of lifting hooks, these attaching elements being indicated at 35. The fittings are preferably made in accordance with my patent No. 1,485,972, and comprise metal pockets having cross bars which are set into and attached to the body at the eaves.

On the upper surface of the walls 12 are shown rails 40 on which ride supporting wheels 41 of a superstructure 42 which extends upwardly on opposite sides of the truck and body and over the top thereof. This superstructure is shown as comprising lower sills 43 carrying the wheels 41, upright posts 44, diagonal braces 45, and horizontal and lateral top beams 46 and 47.

The top portion of the movable superstructure carries four sheaves 50 over which pass four cables 51. The lower end of each cable is provided with a hook 52 adapted to coact with the body fitting 35. The other reach of the cable 51 extends downwardly to a sheave 55, carried by the superstructure near its bottom, and thence the cable passes forward to a suitable stationary anchorage, indicated at 57, for instance an eye set into the wall 12.

The superstructure is provided with a transverse bumper 60 against which the rear ends of the truck sills 21 may abut in the backing movement of the truck. This bumper may also be provided with suitable means for leveling the truck frame. This leveling means is shown as comprising a pair of forwardly projecting prongs 62, having upwardly inclined lower faces 63 which are adapted to coact with rollers 27 carried by the truck sills. The abutment 62 is preferably positioned so that its top is normally higher than the roller 27 of a body-carrying truck. Hence when a truck backs into the pit the rollers 27 will engage the inclines 63, as shown in dotted lines in Fig. 5, and finally come into the position shown in full lines in that figure when the truck sill 21 has abutted the vertical face of the bumper block 60. This will insure the truck being at a definite level at this time.

When the engagement just referred to takes place the parts are in the position shown in Fig. 1. After the truck has come into this position the hooks 52 are attached to the fittings 53 at the eaves of the body. Thereafter as the truck continues to back into the pit, it shoves the superstructure with it. The hoisting cables being all anchored at the forward ends of their horizontal reaches, it follows that this back movement of the superstructure, pulls down on the long vertical reaches of the cables and pulls up on the short reaches attached to the hooks and thus raises the body. Accordingly by the time the truck has backed entirely into the pit, the body will be raised with its floor substantially on a level with the platform 10 as illustrated in Fig. 2. In this position the superstructure is also at the back of the pit and the bumper block 60 thereon has come beneath a bracket 71 projecting from the wall of the platform 10. Now a suitable pin 75 is dropped through an opening in the bracket 71 into a registering opening in the block 70, thus locking the superstructure to the platform wall.

When the superstructure is locked stationary, in its rearmost position as just described, it maintains the body at the proper level for loading and unloading by hand trucking through the doorway 32; it also leaves the truck entirely free to drive out from beneath the superstructure. Accordingly the truck may then move on for other duty.

After the container has been unloaded, and if desired reloaded with other merchandise for fresh delivery, a truck backs into the pit beneath such freshly loaded body. In such movement the rear end of the truck comes against the bumper 60, properly leveling the truck by reason of the abutments 62. Such rearward pressure of the truck serves to relieve the stress of the locking pin 75 so that this pin may be readily withdrawn. Then, the weight of the container, pulling downward on the cables, urges the superstructure forward, causing such superstructure to follow with the truck frame as the latter begins its forward movement and for a short interval until the body comes into position on the frame. The body is accurately positioned by the beveled truck projections 25 entering the beveled recesses in the underface of the body. When the tension has been thus relieved on the cables the hooks may be detached from the body, and then the truck with its loaded container is free for travel away from the station.

I find it convenient to provide spreader bars for the hooks 52 so that they may be clear of the body when they are lowered, but may readily come into engagement with the fittings 35. To this end I have shown each pair of hooks on the same side of the body as connected by a longitudinal positioning bar 80, and these two bars as connected together near their ends with the two spreader bars 81 extending diagonally inwardly and pivoted together. To the pivots of these bars are attached cables 82 which lead upwardly over sheaves 83 toward an intermediate point where they are shown as passing around sheaves 84, Fig. 4 and there joining into a single cable 85 which passes around suitable sheaves 86, and 87 and depends at 88 to a convenient position where it may be operated by the operator in the cab of the truck.

The weight of the spreader bars 81 normally maintains the hooks positioned a distance apart greater than the width of the body 30, and opposite the upper portion of the body, the spreader bars being slightly higher than the roof of the body. Now when a truck with a loaded body drives into the pit, as soon as its rear end has engaged the rear end of the superstructure the operator of the cab pulls downwardly on the cable 88. This movement pulls upwardly on the hinges of the spreader bars and swings the hooks inwardly against the sides of the container just beneath the eave bars 35 which they may engage. Now as the truck continues to move into the pit and the superstructure moves rearwardly, the hooks traveling upwardly come into tight engagement with the container, and then lift it as described.

As heretofore explained when the truck reaches the rear end of the pit the body has thereby been raised to a position with its floor substantially on a level with the platform 10. Then the doors are opened and the load removed from the container, by the aid of hand trucking if desired, after which the container may be reloaded. The reloaded container may then be lowered onto the truck. When the reloaded container has been so lowered, by reason of the outward movement of the truck and superstructure, the tension on the cables 51 slackens as the body becomes seated on the truck; then the weight of the spreader bars 81 operates to swing these bars downwardly into approximately horizontal position, spreading the hooks, freeing them from the container and holding them in position ready to coact with the container on the next truck which is backed into position beneath the superstructure.

I claim:

1. An apparatus for transferring freight comprising a flexible cable having a depending portion adapted to be connected to a demountable automobile body, a sheave supporting the cable, a movable member carrying the sheave and adapted to be moved by the truck carrying the automobile body, and means for anchoring the cable whereby movement of the member by the truck may move the cable about the sheave to lift the automobile body.

2. The combination with a truck runway, of a bodily shiftable superstructure over the same, depending flexible raising devices carried by the superstructure, means for stationarily anchoring the raising devices, whereby the power of the truck moving the superstructure may effect the raising of a body on the truck.

3. The combination of a movable superstructure, flexible raising mechanism depending therefrom and provided with means to engage a demountable automobile body, means for anchoring the flexible raising mechanism independently of the superstructure, and means whereby a truck may engage the superstructure and move it bodily by the power of the truck.

4. The combination with a truck runway, of a superstructure over the same mounted on wheels to travel bodily, raising mechanism carried by the superstructure, and means for actuating the raising device by the travel of the truck, causing the superstructure to shift bodily.

5. The combination of a truck runway, a bodily movable device adjacent the same, raising mechanism carried by said device, means whereby a traveling truck moves said device longitudinally with it at the same speed, and means whereby such movement may raise a body on the truck vertically.

6. The combination of a truck runway, a bodily movable superstructure over the same, depending raising mechanism carried by the superstructure, means whereby a truck beneath the superstructure may shift it bodily with the truck and means whereby such movement may raise the body on the truck.

7. The combination of a movable superstructure, flexible raising mechanism depending therefrom and having a substantially horizontal reach anchored to a stationary point, whereby the movement of the superstructure may raise the depending reach of the flexible raising mechanism, and means for attaching such flexible raising mechanism to a demountable body on a truck beneath the superstructure, the truck being adapted to move the superstructure and thereby raise the body.

8. The combination with a truck runway, of a bodily movable superstructure above the same, the truck being adapted to move by backward movement in the runway into position beneath the superstructure, means whereby the truck may engage such superstructure to move it bodily with the truck, raising mechanism carried by the superstructure and adapted to engage a demountable body on the truck, means whereby such raising mechanism is operated by the backward movement of the superstructure, and means for locking the superstructure in its backward position whereby the body is maintained in raised position.

9. The combination of a truck runway, a superstructure spanning the runway at a substantial elevation and adapted to travel bodily lengthwise of the runway whereby a truck with a demountable body may back into position beneath the spanning portion of the superstructure, raising mechanism depending from such spanning portion of the superstructure and adapted to engage the body, means whereby said mechanism is drawn upwardly by reason of the backward movement of the superstructure, whereby a truck backing into the runway and engaging the superstructure and shoving it rearwardly will raise the body from the truck.

10. The combination of a truck runway, a wheeled superstructure spanning the runway a substantial elevation, whereby a truck with a demountable body may move into position beneath the spanning portion of the superstructure, a raising cable depending from the superstructure and adapted to be connected to the body, a sheave at the top of the superstructure over which the cable passes, sheaves guiding such cable downwardly and forwardly, and means for anchoring the forward end of the cables whereby a truck backing into the runway may shove the superstructure rearwardly and thereby raise the body from the truck.

11. The combination of a truck runway, rails on opposite sides thereof, a superstructure having spaced upright portions provided with wheels tracking on the respective rails and having a bridgework across the runway, depending flexible raising mechanism carried by said bridgework and adapted to engage a demountable body on a truck beneath the bridgework, means whereby such truck may shift the superstructure bodily, and means whereby such shifting movement may cause the raising mechanism to pull upon the body.

12. The combination with a raised platform having an adjacent truck runway, a bodily movable superstructure over the runway, a depending cable carried by the superstructure and adapted to be connected to a movable body on a truck in the runway, means whereby the backup movement of the truck may move the superstructure bodily, means whereby such movement causes a pull on the cable to raise the body into registration with the platform, and means for locking the superstructure in position with the body raised.

13. The combination of a platform and an adjacent truck runway, track rails on opposite sides thereof, a superstructure having wheels engaging the rails and spanning the space between them at a substantial elevation, whereby a truck with a demountable body may back into position between the rails and beneath the spanning portion of the superstructure, four raising cables depending from the superstructure and adapted to engage four points at the corner of a rectangle on the body, sheaves at the top of the superstructure over which cables pass, sheaves guiding such cables downwardly and forwardly substantially parallel with the rails, means for anchoring the forward ends of the cables whereby a truck backing into the runway may shove the superstructure rearwardly and thereby raise the body from the truck, and means for locking the superstructure in its rearmost position whereby the body may be maintained raised on an unloading level with the adjacent platform.

14. In a freight transferring apparatus, the combination of a movably mounted superstructure, a raising mechanism carried thereby and operating in the raising direction by movement of the superstructure, a bumper on the superstructure which a truck backing beneath it may engage, and means for automatically leveling such truck.

15. The combination of a pair of parallel tracks having a truck runway between them, a superstructure movably mounted on the tracks having upright portions and a top portion adapted to extend over a demountable body on such truck, a bumper on the superstructure, an inclined projection carried by the superstructure and coacting with means on the truck frame as the latter backs into position against the bumper, and raising mechanism for the body actuated by the backward movement of the superstructure.

16. The combination with a freight platform having a pit for a truck, a superstructure spanning the pit and movable lengthwise thereof, means whereby a truck backed into the pit may engage the superstructure and shove it backward along the pit, flexible raising mechanism carried by the superstructure and adapted to be connected to a demountable body on the truck, said flexible raising mechanism being anchored to a stationary point and being so guided that the backward movement of the superstructure raises the portion of the flexible raising mechanism connected to the body, an anchorage device secured rigidly with the platform, and means to lock it to the superstructure when the same has been shoved rearwardly by the truck.

17. An apparatus for transferring freight comprising an elevated support, sheaves thereon, flexible raising means depending vertically over said sheaves and provided with means to engage an automobile body and means actuated by horizontal movement of a truck carrying said body for pulling said raising means about their sheaves to raise the body.

18. The combination of a movable superstructure having supporting wheels, flexible raising mechanism anchored to a relatively stationary point and depending over sheaves carried by the superstructure whereby the movement of the superstructure may raise the depending reach of the flexible raising mechanism, means for attaching such flexible raising mechanism to a demountable body on a truck beneath the superstructure, and means whereby the truck by its own power may move the superstructure and thereby raise the body.

19. The means for transferring freight by the aid of an automobile truck and a demountable body thereon, comprising a shiftable support provided with a sheave, a flexible raising member adapted to be attached to the body and extending over the sheave and anchored to an extraneous point, and means on the support adapted to be engaged by the truck, whereby the truck may move the support as the truck moves.

20. The means for handling freight by the aid of an automobile truck and a demountable body, comprising a superstructure beneath which the truck may back, sheaves carried by said superstructure above the truck, cables extraneously anchored and leading over the sheaves, thence depending, and arranged to be attached to the demountable body, and a bumper on the superstructure in the path of the truck, whereby the truck, when backing, may engage the superstructure and shove it horizontally with the truck.

In testimony whereof, I hereunto affix my signature.

BENJAMIN F. FITCH.